A. HILLSTROM.
AUTOMATIC SHOCK LOADER.
APPLICATION FILED JULY 27, 1910.
992,665.
Patented May 16, 1911.
2 SHEETS—SHEET 2.
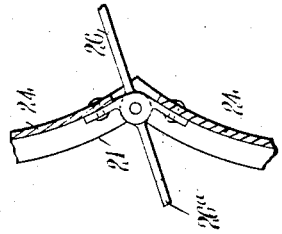
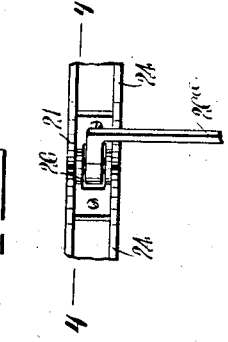
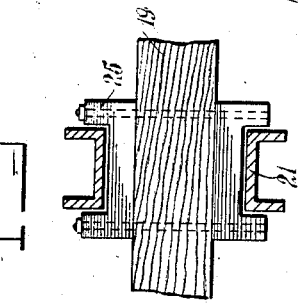
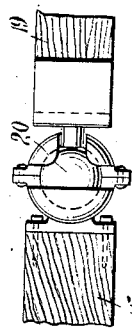
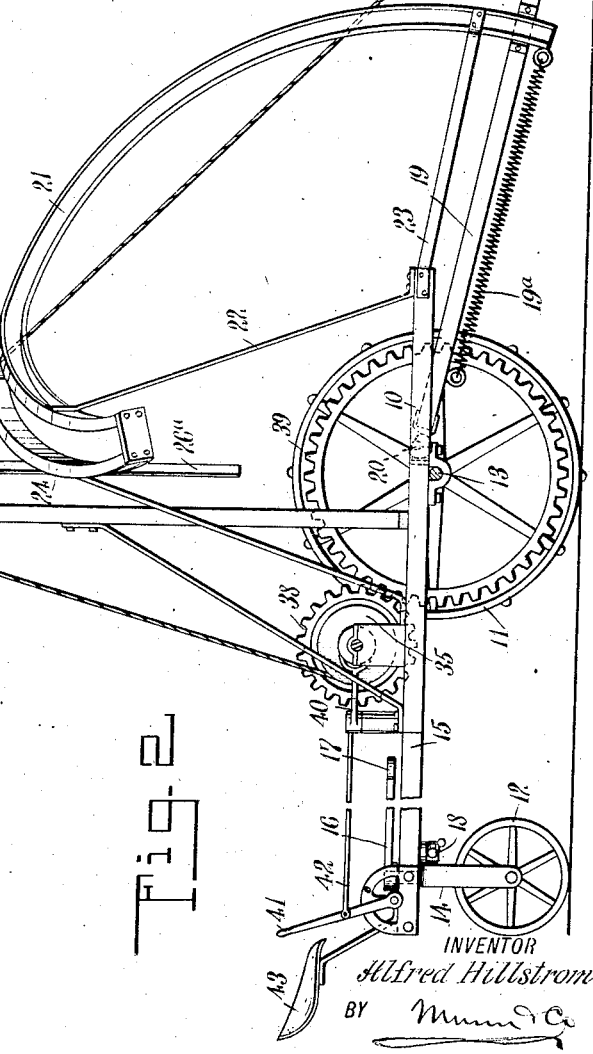
WITNESSES:
J. A. Brophy
INVENTOR
Alfred Hillstrom
BY Munn & Co
ATTORNEYS

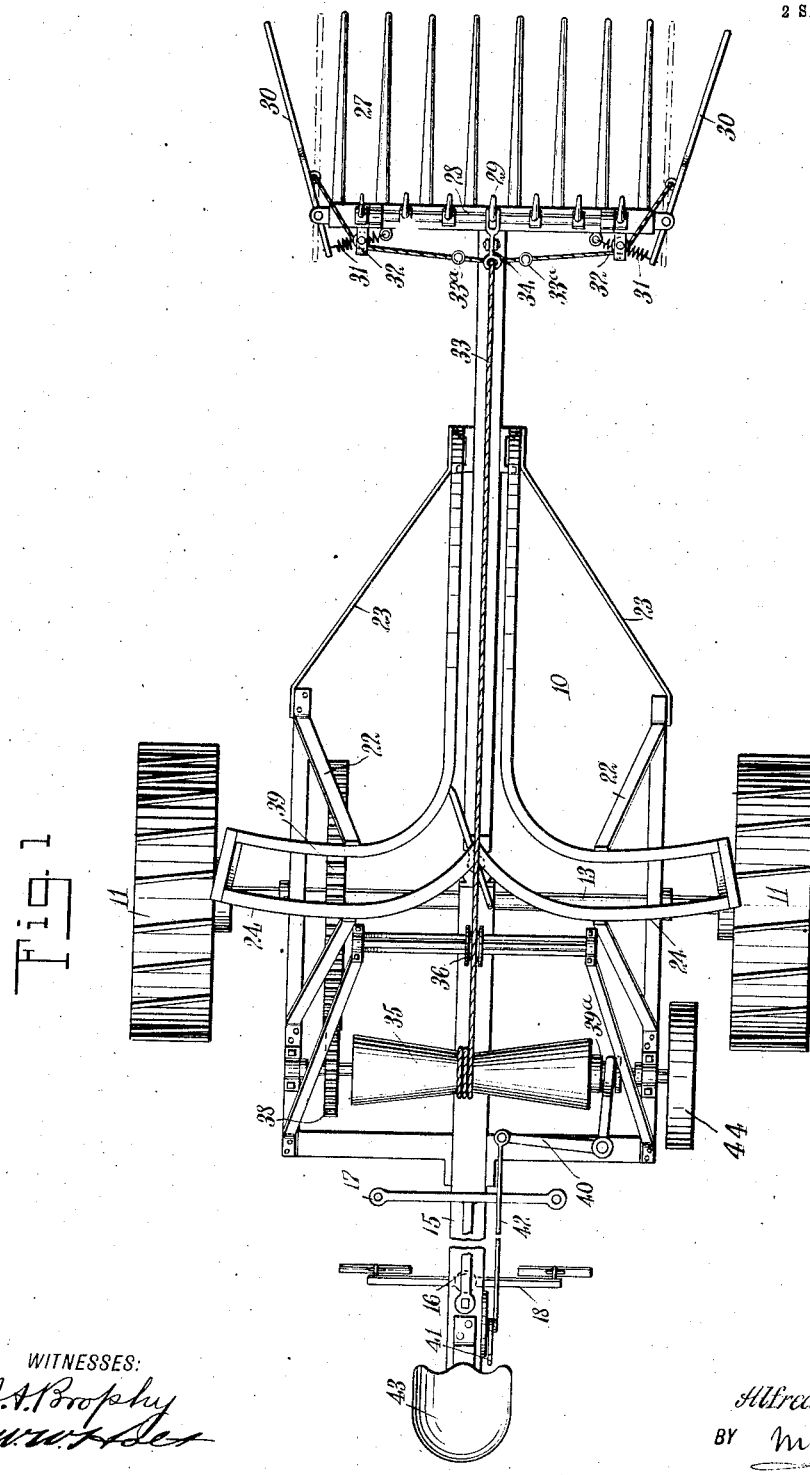

UNITED STATES PATENT OFFICE.

ALFRED HILLSTROM, OF PULLMAN, ILLINOIS.

AUTOMATIC SHOCK-LOADER.

992,665.  Specification of Letters Patent.  Patented May 16, 1911.

Application filed July 27, 1910. Serial No. 574,120.

*To all whom it may concern:*

Be it known that I, ALFRED HILLSTROM, a citizen of the United States, and a resident of Pullman, in the county of Cook and State of Illinois, have invented a new and Improved Automatic Shock-Loader, of which the following is a full, clear, and exact description.

The invention is an improvement in shock loaders, and belongs to that class of machines embodying a wheeled truck having a shock-loading mechanism, and which is adapted to travel alongside a hay rack or wagon and load the shocks therein.

The invention has in view a machine adapted to load the shocks while continuously traveling, and embodying a fork pole fulcrumed to the front of the truck to swing both vertically and laterally, and directed in its movements by a downwardly and outwardly-inclined guide having guide arms at the top extending to the opposite sides of the truck, a switch being arranged at the fork of the guide to direct the pole into either of the arms.

The invention further resides in the mechanism for raising the pole and automatically gripping the shock, which is under the control of the driver or operator, and acts to raise the pole, together with the fork and the gripping means, relatively slow at the outset, when the leverage on the pole is great, and gradually accelerates the movement of the pole as the leverage of the latter diminishes.

Reference is to be had to the accompanying drawings forming a part of this specification, in which similar characters of reference indicate corresponding parts in all the views.

Figure 1 is a plan of my improved shock loader complete; Fig. 2 is a side elevation of the same; Fig. 3 is a fragmentary rear view of the guide at the fork, showing the switch-controlling lever; Fig. 4 is a section on the line 4—4 of Fig. 3; Fig. 5 is a fragmentary view, showing the joint between the push bar of the truck and the fork pole; and Fig. 6 is a section through the guide, showing a portion of the fork pole.

In the construction of my improved shock loader, I employ a wheeled truck having a frame 10, front traction wheels 11 and a rear steering wheel 12, the traction wheels being carried on an axle 13, and arranged at each side of the truck frame, and the steering wheel 12 carried on a fork 14 which is vertically journaled in the rear end portion of a central push bar 15 of the frame, and has an attached forwardly-extending arm 16, to which is connected a neck yoke 17, the same, in connection with the double tree 18, serving to hitch the draft animals, and also to guide the machine.

The central push bar 15 is extended to a point near the forward axle 13, and to its forward end is fulcrumed to swing vertically and laterally a fork pole 19, the connection between the push bar and fork pole being made by a ball and socket or other universal joint 20. The fork pole is directed in its movement by an approximately T-shaped guide 21, the guide being supported at the front of the frame by suitable braces 22 and 23, and comprising the central longitudinally-extending portion and the laterally-extending guide arms 24 at the top, these guide arms leading to the opposite sides of the machine directly over or adjacent to the wheels 11. The longitudinal central portion of the guide curves downwardly and forwardly, and the arms not only curve laterally, as viewed in plan, but from the fork of the guide curve downwardly and outwardly. The guide is preferably constructed of spaced channel irons, as shown in Figs. 2 and 6, with the flanges of the irons turned outwardly. These irons or rails are engaged by grooved guide blocks 25, shown to be secured to the opposite sides of the fork pole. With the guide blocks thus applied it is obviously necessary that all points of the guide 21 be equidistant from the universal joint 20. However, by making the guide blocks slidable on the pole it is not necessary that the guide be so arranged. At the fork of the guide is fulcrumed a switch 26, adapted to swing to a position closing the inner end of the slot in each laterally-extending guide arm, whereby the pole when lifted will be directed into the arm opposite. The switch is provided with any suitable controlling lever 26ª.

A spring 19ª is shown to be attached at one end to the pole in advance of the ball and socket joint 20, with the opposite end of the spring connected to the lower end of the guide or other fixed part of the frame.

At the outer or forward end of the pole is attached a fork 27, the tines of which extend forwardly and are adapted to bear flat on the ground, as shown in Fig. 2. At the top of the fork and arranged along the fork bar is an oscillatory shaft 28 having a number of fingers or tines 29 normally extending upwardly; and at each end of the fork fulcrumed to the fork bar to swing inwardly to and from each other a substantial distance above the fork tines are arms 30, the arms being normally forced apart in forwardly-diverging positions by springs 31. At the inner side of each arm at the rear of the fork bar is applied a sheave 32, over which one branch of a cable 33, attached to the adjacent arm 30, in advance of its pivot, passes, the two branches of the cable also passing through the eye at the inner arm of a lever 34, which lever is connected to the central finger or tine 29 of the shaft 28. Each branch of the cable is provided with a stop 33$^a$, arranged to limit the passage thereof through the eye of the lever 34.

The cable 33 is wound on a drum 35, from which it passes over a sheave 36, supported in an elevated position above and directly at the rear of the fork of the T-shaped guide 21, on a post 37. From the sheave 36 the cable passes to the fork. The drum 35 is shown to be of double conical form, with the reduced portion at the center, and is journaled transversely of and at the rear of the machine frame, with the shaft or axis of the drum having a gear 38 in mesh with a larger gear 39 fixed to the axle 13.

To operatively connect the drum to and disconnect it from the shaft, and in this manner raise and lower the fork, a clutch 39$^a$ is splined to the shaft and is operatively engaged by one arm of a bell-crank lever 40, with the opposite arm of the lever connected to a controlling lever 41, by a link 42, the operating lever 41, as shown, being arranged conveniently to the driver's seat 43, attached to the rear end of the push bar. In order that the drum will run smoothly and the fork raised without jerk, the drum shaft is provided with a balance wheel 44.

In the operation of the machine, the machine is driven along the line of the shocks, with the wagon or hay rack at either side. As the shocks are picked up by the rake, the driver throws the drum into gear by the operation of the controlling lever 41, the drum drawing on the cable and causing the arms to move inwardly into engagement with the shock until the stops 33$^a$ strike the lever 34, when the fingers 29 are thrown forwardly, after which the further pull on the cable raises the pole, and as the pole passes the fork of the guide it is directed by the switch into one of the arms and drops by gravity to the end of the latter and releases the shock into the wagon or rack. The drop of the pole to the bottom of the arm is broken by the spring 19$^a$, which spring, as soon as the shocks are released, returns the pole to the guide fork, where the pole drops to operative position by gravity. As soon as the pole passes the fork of the guide in raising the rake with the shocks, the driver throws the drum out of gear. By reason of the particular form of the drum 35, the pole and rake are raised relatively slow at the beginning of the elevating movement, at which time the leverage of the shocks on the pole is greatest, after which the movement of the pole is relatively faster. By successively operating the pole and connected mechanism as the shocks are picked up, and during the interval the machine is passing from one shock to the next, the machine is adapted to move continuously along the line of shocks.

Having thus described my invention, I claim as new and desire to secure by Letters Patent:

1. In a shock loader, a wheeled truck, a fork pole fulcrumed to the front of the truck to swing vertically and laterally, and a guide directing the movements of the pole, inclined downwardly and forwardly at the front of the truck and having extending guide arms at the upper ends extending laterally respectively to the opposite sides of the truck.

2. In a shock loader, a fork pole fulcrumed to swing vertically and laterally, and a T-shaped guide for directing the movements of the pole, inclining downwardly and forwardly, with the arms of the guide inclining downwardly and outwardly.

3. In a shock loader, a fork pole fulcrumed to swing vertically and laterally, a T-shaped guide for directing the movements of the pole, inclining downwardly and forwardly, with the arms of the guide inclining downwardly and outwardly, and a switch to direct the pole into either of the arms of the guide.

4. In a shock loader, a wheeled truck, a fork pole fulcrumed to the front of the truck, having a forwardly-directed fork, arms fulcrumed at the opposite sides of the fork to swing a substantial distance above the fork tines and normally forced outwardly, an oscillatory shaft having fingers normally extending upwardly at the rear of the fork tines, and a cable to swing the arms inwardly and the fingers forwardly to the shock and raise the pole.

5. In a shock loader, a wheeled truck, a fork pole fulcrumed to the front of the truck, having a forwardly-directed fork, arms fulcrumed at the opposite sides of the fork to swing a substantial distance above the fork tines and normally forced outwardly, an oscillatory shaft having fingers normally extending upwardly at the rear of the fork tines, a cable to swing the arms inwardly and the fingers forwardly to the shock and raise the pole, and a guide to automatically direct the pole in its raised position to one side of the truck.

6. In a shock loader, a wheeled truck having a rearwardly-extending central push bar provided with a steering wheel, a fork pole fulcrumed to the forward end of the bar to swing vertically and laterally, a T-shaped guide to direct the movements of the pole, curving downwardly and outwardly and supported on the truck, a drum journaled on the truck, a sheave supported on the truck in an elevated position between the truck and the rear end of the pole, and a cable to raise the pole, running to the drum over the sheave.

7. In a shock loader, a wheeled truck, a fork pole fulcrumed to the front of the truck to swing vertically and laterally, a guide to direct the movements of the pole, curving downwardly and outwardly at the front of the truck and having at its upper ends, arms forking to the opposite sides of the truck and curving downwardly and outwardly, a drum carried by the truck, a cable to elevate the pole in the guide, passing through the drum, and a spring arranged to break the fall of the pole and return the pole to the fork of the arms of the guide in passing to and from either of said arms.

8. In a shock loader, a wheeled truck, a fork pole fulcrumed to the front of the truck to swing vertically, and having a forwardly-directed fork at its forward end, an arm fulcrumed at each side of the fork to swing a substantial distance above the tines thereof, springs normally retracting the arms, an oscillatory shaft arranged at the rear of the tines of the fork and having a series of fingers, a lever fulcrumed intermediate its length and operatively connected to one of the tines of the fork above the shaft, and a cable to swing the pole vertically, passing through the other arm of the lever and having branches operatively connected to the spring arm.

9. In a shock loader, a wheeled truck having forward traction wheels and a rear guide wheel, the truck having a central push bar, the rear guide wheel having a fork vertically journaled in the push bar and provided with a neck yoke, a tree connected to the push bar at the rear of the yoke, a shaft journaled on the truck in advance of the neck yoke, having a drum, a gear fixed relatively to the traction wheels, a gear fixed to the shaft in mesh with the first-named gear, a clutch for connecting and disconnecting the drum and the shaft, a rake pole fulcrumed at the front of the truck to swing vertically and laterally, a guide supported at the front of the truck to direct the pole in its movements, curving downwardly and outwardly and having laterally-extending arms at the upper portion thereof, a sheave supported in an elevated position on the truck between the guide and drum, and a cable to raise the pole, passing over the sheave to the drum.

In testimony whereof I have signed my name to this specification in the presence of two subscribing witnesses.

ALFRED HILLSTROM.

Witnesses:
THURE GUSTAVISON,
CARL LUNDBERG.